United States Patent

Park

[11] Patent Number: 5,803,217
[45] Date of Patent: Sep. 8, 1998

[54] APPARATUS AND METHOD FOR CONTROLLING A DAMPER CLUTCH FOR A VEHICLE

[75] Inventor: Young-Jun Park, Seoul, Rep. of Korea

[73] Assignee: Hyundai Motor Co., Ltd., Seoul, Rep. of Korea

[21] Appl. No.: 656,790

[22] Filed: May 31, 1996

[30] Foreign Application Priority Data

Jun. 1, 1995 [KR] Rep. of Korea .................. 1995-14530

[51] Int. Cl.$^6$ .................................................. F16H 61/14
[52] U.S. Cl. ..................... 192/3.31; 74/473.19; 192/3.62; 192/82 T
[58] Field of Search .................... 192/82 T, 3.62, 192/3.29, 3.31, 3.3, 3.58; 477/81, 65, 62; 74/473 R, 473.19

[56] References Cited

U.S. PATENT DOCUMENTS

| | | | |
|---|---|---|---|
| 4,463,842 | 8/1984 | Redzinski | 477/65 X |
| 4,468,988 | 9/1984 | Hiramatsu | 192/82 T X |
| 4,678,069 | 7/1987 | Yoshimura et al. | 192/82 T X |
| 4,718,525 | 1/1988 | Yamaguchi . | |
| 4,779,489 | 10/1988 | Haley | 192/82 T X |
| 4,843,918 | 7/1989 | Morimoto | 192/3.31 X |
| 5,172,603 | 12/1992 | MacInnis | 74/473 R |
| 5,557,981 | 9/1996 | Neal et al. | 74/473 R |
| 5,598,334 | 1/1997 | Shin et al. | 74/731.1 X |

*Primary Examiner*—Rodney H. Bonck

[57] ABSTRACT

An apparatus and method for controlling a damper clutch for an automatic transmission of a vehicle are disclosed. The apparatus includes a shift lever for shifting a transmission gear of the vehicle, a handle for moving the shift lever, a damper switch disposed on the handle for manually selecting an operation of the damper clutch, and a control unit for controlling the damper clutch according to the damper switch and predetermined conditions.

12 Claims, 2 Drawing Sheets

APPARATUS AND METHOD FOR CONTROLLING A DAMPER CLUTCH FOR A VEHICLE

BACKGROUND OF THE INVENTION

1. Field of the Invention

The present invention relates to a damper clutch actuating apparatus of an automatic transmission for a vehicle and a method for controlling a damper clutch of a vehicle and more particularly, to an improved damper clutch actuating apparatus for preventing power loss and heat build-up in a transmission oil by selectively operating the damper clutch according to predetermined conditions.

2. Description of Related Art

Various types of damper clutch actuating apparatuses for an automatic transmission of a vehicle are known in the art. Generally, a conventional damper clutch (e.g. lock-up clutch) is installed within a housing of a torque converter, which rotates at the same speed as the engine of a vehicle and transmits the engine power to a transmission.

When the vehicle is moving in neutral, "N" range, the hydraulic pressure of an oil pump driven by the driving force of the engine is supplied to a clutch control valve. When the vehicle is in drive, "D" range, the hydraulic pressure is also supplied to the clutch control valve by the driving force of the engine. The damper clutch control valve controls the actuation or removal of a damper clutch of the torque converter by changing or controlling a solenoid valve through a transmission controlling unit (TCU).

Such conventional damper clutch actuating apparatuses, however, suffer from a number of problems. For example, fluid slippage of the torque converter based on the separation of the damper clutch which operates close to the inside of the torque converter, due to poor damper clutch control, causes heat build up in the transmission oil. This heat build up results in a loss of transmitting power and decreased fuel economy (i.e., a decreased fuel ratio). Consequently, conventional damper clutch actuating apparatuses do not provide trustworthy operation and performance.

SUMMARY OF THE INVENTION

Accordingly, it is an object of the present invention to provide an improved damper clutch actuating apparatus for an automatic transmission of a vehicle and a method of controlling a damper clutch, which eliminates the above problems encountered with conventional damper clutch actuating apparatuses.

Another object of the present invention is to provide a damper clutch system including a damper clutch installed in a torque converter and a shift lever for compulsorily accomplishing the actuation of the damper clutch, so as to prevent power loss and heat build up in a transmission oil and improve a fuel ratio.

A further object of the present invention is to provide an apparatus and method for controlling a damper clutch for a vehicle, which includes a damper switch disposed on a shift lever for manually selecting an operation of the damper clutch, and a transmission control unit connected to the damper switch for detecting a temperature of a transmission oil and a revolution number of an engine, whereby when the damper switch is in an ON position, the damper clutch can be compulsorily adhered to a torque converter, and when the damper switch is in an OFF position, the damper clutch can be operated in a given operation area.

Accordingly, the damper clutch actuating apparatus of the present invention can effectively improve a fuel consumption by preventing a fluid slippage and can prevent power loss, heat build up in the transmission oil, and engine brake-ups, especially when the vehicle is driven on a downhill curve road.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an apparatus for controlling a damper clutch for a vehicle, including shift means for shifting a transmission gear of the vehicle; switch means connected to the shifting means for manually selecting an operation of the damper clutch; and control means for controlling the damper clutch according to the switch means and predetermined conditions.

Furthermore, a method of controlling a damper clutch for a vehicle according to the embodiments of the present invention, includes the steps of manually selecting a damper switch for controlling the damper clutch; carrying out a determination operation; and controlling the damper clutch according to the manual selection and a result of the determination operation.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
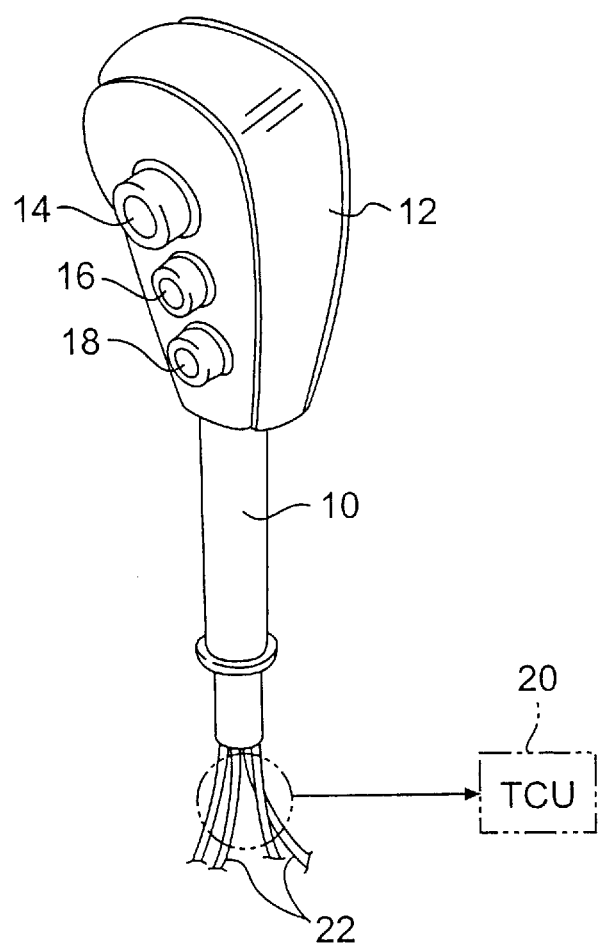
FIG. 1 is a perspective view of a damper clutch actuating apparatus of an automatic transmission for a vehicle according to the embodiments of the present invention.
Figure 2:
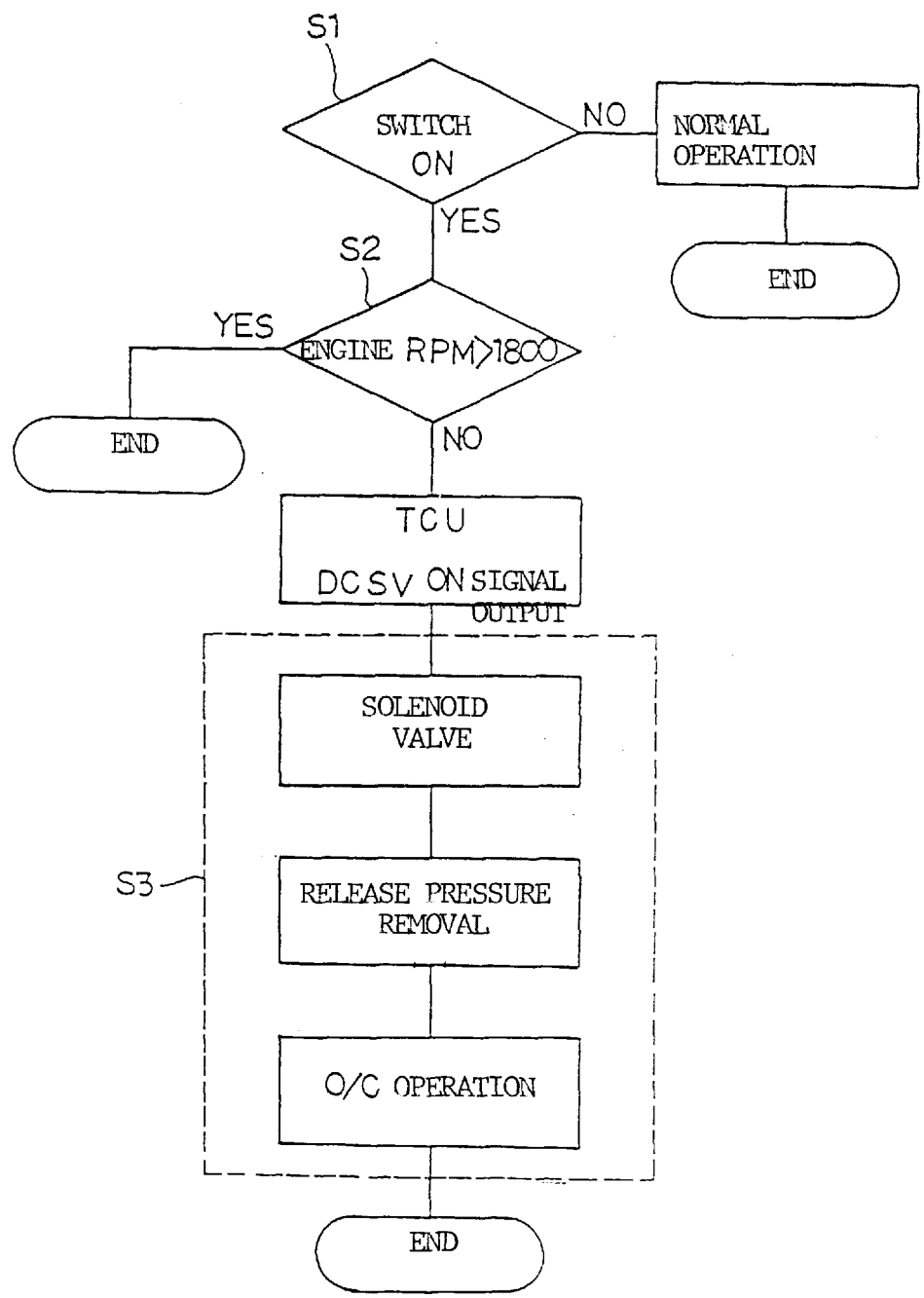
FIG. 2 is a flow chart for explaining a method of controlling the damper clutch according to the embodiments of the present invention.

Referring now in detail to the drawings for the purpose of illustrating preferred embodiments of the present invention, the damper clutch actuating apparatus for a vehicle as shown in FIGS. 1 and 2 includes a shift lever 10 for changing a transmission gear (not shown), a handle 12 disposed on a top portion of the shift lever 10, and a plurality of lines 22 disposed within the shift lever 10 and controlled by a transmission control unit (TCU) 20. The handle 12 is provided with a push button 14, an overdrive switch 16, and a damper switch 18 orderly disposed thereon from a top thereof.

As shown in FIG. 2, an operation of controlling a damper clutch according to the embodiments of the present invention is as follows.

When a vehicle goes up or down a hill and if the driver pushes the damper switch 18 on the handle 12, the damper switch 18 offers an ON/OFF judgement input to the transmission control unit 20.

At this time, if the transmission control unit 20 judges in step S1 that a temperature of the transmission oil is below 60° C., the damper switch 18 is placed in an OFF position. Then, the damper clutch is released and at the same time, the damper clutch operates in the present operation state.

If the damper switch 18 is judged to be in the ON position in step S1, the operation proceeds to a revolution number judgement step S2. In step S2, if the engine RPM (revolution per minute) is over 1800, the damper clutch is released and its operation ends.

On the other hand, if the engine RPM is less than or equal to 1800, the operation moves to the transmission control unit 20 which controls each line 22 disposed within the shift lever 10. Then, the transmission control unit 20 operates in step S3 a solenoid valve (not shown) to carry out the damper clutch operation. The solenoid valve is operated by the hydraulic pressure outputted according to an ON signal of a reduction control valve (not shown)

Thereafter, the hydraulic pressure (fluid pressure) is supplied from the damper clutch control valve to the torque converter. This eliminates release pressure of the damper clutch and simultaneously, the damper clutch operates. Thus, the damper clutch operation of the present invention increases power transmitting efficiency.

Accordingly, the damper clutch system of an automatic transmission according to the present invention provides an ON/OFF operation of a damper clutch selectable by the driver of the vehicle, prevents an engine power loss due to fluid slippage generated when the damper clutch separates from the closely adhered torque converter so as to improve a fuel ratio, and prevents heat build-ups in the transmission oil, which causes the engine to malfunction.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for controlling a damper clutch for a vehicle, the apparatus comprising:

a shift lever for changing a transmission gear of the vehicle;

a shift handle connected to the shift lever for moving the shift lever;

switch means disposed on the shift handle for manually selecting an operation of the damper clutch and overdrive; and control means for controlling the damper clutch according to the switch means and predetermined conditions, wherein the control means determines, as one of the predetermined conditions, whether a temperature of transmission oil is below a predetermined temperature, wherein if the control means determines that the temperature of the transmission oil is not below the predetermined temperature, the control means further determines whether an engine RPM is greater than a predetermined RPM, and wherein if the control means determines that the engine RPM is greater than the predetermined RPM, the control means releases the damper clutch.

2. An apparatus of claim 1, wherein the switch means selects between an On operation and an Off operation of the damper clutch.

3. An apparatus of claim 1, wherein the predetermined temperature is approximately 60° C.

4. An apparatus of claim 1, wherein if the control means determines that the temperature of the transmission oil is below the predetermined temperature, the control means places the damper clutch in an OFF position.

5. An apparatus of claim 1, wherein if the control means determines that the engine RPM is not greater than the predetermined RPM, the control means operates a solenoid valve to carry out a damper clutch operation.

6. An apparatus of claim 1, wherein the predetermined RPM is approximately 1800.

7. An apparatus of claim 6, wherein the predetermined temperature of the transmission oil is approximately 60° C.

8. An apparatus of claim 1, wherein the switch means includes a damper switch and an overdrive switch both disposed on the shift handle for being operated by the user who drives the vehicle.

9. A method of controlling a damper clutch for a vehicle, comprising the steps of:

manually selecting a damper switch disposed on a shift handle of the vehicle;

carrying out a determination operation; and controlling the damper clutch according to the manual selection and a result of the determination operation, wherein the controlling step includes the steps of, first determining whether a temperature of a transmission oil is below a predetermined temperature, second determining whether an engine RPM is greater than a predetermined RPM based on a result of the first determination, and releasing the damper clutch if it is determined that the engine RPM is greater than the predetermined RPM.

10. A method of claim 9, wherein the step of determining the engine RPM is carried out if the temperature of the transmission is determined to be above the predetermined temperature.

11. A method of claim 10, wherein the predetermined temperature is approximately 60° C. and the predetermined RPM is approximately 1800.

12. A method of claim 11, wherein the controlling step includes the step of:

operating a solenoid valve to carry out a damper clutch operation if it is determined that the engine RPM is not greater than the predetermined RPM.

* * * * *